United States Patent
Kaida et al.

[11] 3,886,745
[45] June 3, 1975

[54] HYDRAULIC ACTUATING DEVICE
[75] Inventors: Fukumi Kaida; Risaburo Nonaka, both of Kawagoe; Takeo Sugii, Tokyo; Tetsuo Haraikawa, Funabashi, all of Japan
[73] Assignees: Tokico Ltd., Fujimi; Nippon Oils and Fats Co. Ltd., Tokyo, both of Japan
[22] Filed: Dec. 21, 1973
[21] Appl. No.: 427,104

[30] Foreign Application Priority Data
Dec. 27, 1972 Japan.................................. 48-584

[52] U.S. Cl. ...................... 60/533; 60/593; 60/632; 188/72.5
[51] Int. Cl............................................. F15b 13/04
[58] Field of Search ............ 60/26.1, 533, 593, 632; 188/72.5; 149/19.92

[56] References Cited
UNITED STATES PATENTS

| 726,080 | 4/1903 | Macbeth et al. | 60/593 |
| 3,031,845 | 5/1962 | Ludwig | 60/26.1 |
| 3,476,622 | 11/1969 | Harada et al. | 149/19.91 |
| 3,654,689 | 4/1972 | Schwarz | 188/72.5 |
| 3,656,296 | 4/1972 | Wills | 60/26.1 |
| 3,692,495 | 9/1972 | Schnecter et al. | 280/150 |
| 3,692,597 | 9/1972 | Brockway et al. | 149/19.92 |

Primary Examiner—Martin P. Schwadron
Assistant Examiner—H. Burks, Sr.
Attorney, Agent, or Firm—Wenderoth, Lind & Ponack

[57] ABSTRACT

A hydraulic actuating device has a gas generating means having a first piston slidable in a fluid tight relation therein, a given amount of self-combustible material charged in a chamber adjacent to the piston on one side thereof and an igniting means for said material; an ignition signal transmitting means to transmit an igniting signal to said igniting means; an actuating cylinder communicating with another chamber on the other side of said piston in said gas generating means and having a second piston slidable therein, with a liquid being filled between one side of said second piston and said other side of said first piston in said gas generating means; wherein said igniting means may be actuated by said signal transmitting means to ignite said self-combustible material for applying gas pressure produced thereby to said first piston on said one side thereof, thus producing liquid pressure on said other side of the first piston which is transmitted to the actuating cylinder to actuate the second piston.

3 Claims, 4 Drawing Figures

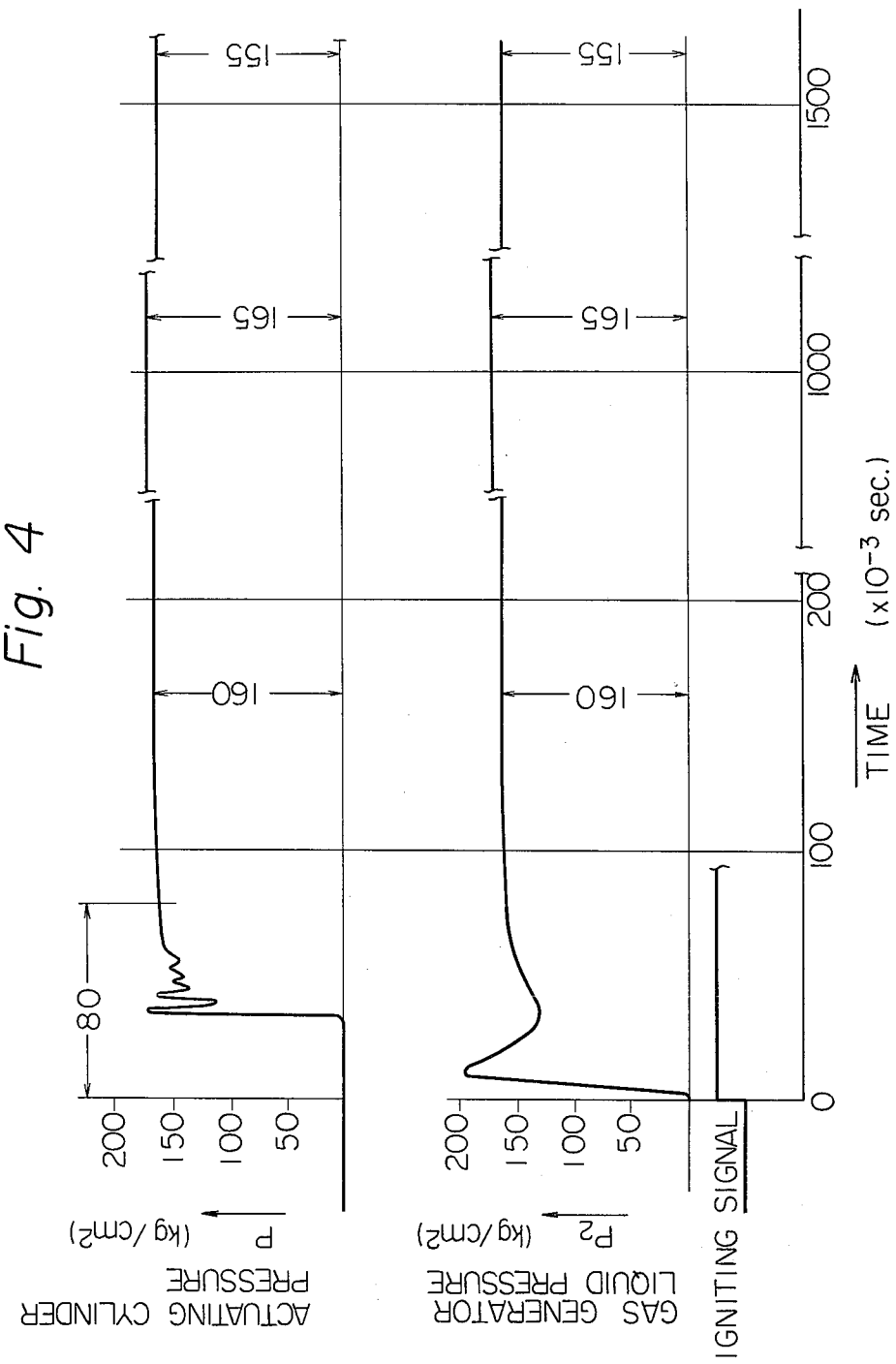

HYDRAULIC ACTUATING DEVICE

BACKGROUND OF THE INVENTION

This invention relates to a hydraulic actuating device, and more particularly to a device adapted for use in a safety device or an emergency braking device for a machines, vehicles or other devices.

For instance, in a fluid transfer means such as a pipe line for transferring petroleum therethrough, there is provided an emergency stopping valve in the pipe line to cope with an emergency condition such as leakage of oil, fire or the like, by taking actions such as closing the pipe line rapidly. Accordingly, it is desired for such an emergency stopping valve in the event of accidents or fire that the operations required be carried out positively and immediately when the occurrence thereof is detected. Conventionally, for closing such an emergency stopping valve, a pipe line through which fluid is introduced to actuate the emergency stopping valve is opened by means of an electromagnetic valve and the like provided in the pipe line. However, such methods suffer from disadvantages in that a separate actuating fluid source should be provided and that there is a danger of the valve body or related parts thereof being corroded, because the valve body or the relating parts of the emergency stopping valve is not in use for a long period of time, such that the actuating fluid fails to operate such a valve with its pressure, or operates same in an undesirable manner. Accordingly, it remains a desire of those in the art to provide a simple and economical means for actuating such a valve positively.

Meanwhile, in industrial equipment such as press machines or shearing machines, ordinary operations, i.e., operating and stopping operating parts thereof are carried out by operating means suited for an intended purpose, such as for instance by means of a hydraulic circuit including a hydraulic pump and a hydraulic cylinder. However, there is provided a safety device in such a machine for rapidly stopping or braking the machine to provide for a case where an operator makes an error in operations and brings his arm or finger into a dangerous space. Such a safety device should detect the presence of such an arm or finger and knock same out of such a dangerous space, or brake or stop the machine immediately. However, there remains a problem that there is required a certain lapse of time from the moment when such a danger is detected by a danger monitering means until an emergency action or operation is taken. This sometimes results in a big fire hazard. More particularly, in a case where a danger is detected and then an electric motor is stopped or an electromagnetic emergency stopping valve is closed to interrupt the feed of hydraulic oil for stopping the operating cylinder, there necessarily arises a delay in the operation of each component or displacement of operating parts to be stopped due to inertia, from the time when the emergency signal is issued until the completion of such an operation. It follows that there arises a substantial time lag accumulated in such components from the issuance of a stopping signal to its final stop.

Meanwhile, it is often the case that actual accidents or hazards are caused due to the delay, when escaping, of an extremely short time, such as several tenths of a second. As a result, it is a prerequisite in preventing accidents to minimize such a time lag.

On the other hand, a quite short time delay is not allowed when braking a high speed vehicle such as an automobile, when a danger is detected. The faster the initial operation, and the higher the operational speed, there will be ensured a higher safety level.

SUMMARY OF THE INVENTION

According to the present invention, there is provided a hydraulic actuating device which can instantaneously produce a high fluid pressure to obtain a great operational force for an extremely short time after the issuance of a starting signal, thereby ensuring safety for operators of the aforesaid machines or devices and effecting emergency operations required for preventing accidents.

According to the present invention, there is provided a hydraulic actuating device, which comprises a gas generating means having a first piston slidable in a fluid tight relation therein, a given amount of self-combustible material charged in a chamber adjacent to a first piston on one side thereof and an igniting means for said material; an ignition signal transmitting means to said igniting means; an actuating cylinder communicating with another chamber on the other side of said piston in said gas generating means and having a second piston slidable therein, with a liquid being filled between one side of said second piston and said other side of said first piston in said gas generating means; wherein said igniting means may be actuated by said signal transmitting means to ignite said self-combustible material for applying gas pressure produced thereby to said first piston on said one side thereof, thus producing liquid pressure on said other side of the first piston which is transmitted to the actuating cylinder to actuate the second piston.

It is a further object of the invention to provide a hydraulic actuating device which, due to its novel construction, may operate in a safe and effective manner.

BRIEF DESCRIPTION OF THE DRAWING

These and other objects and features of the invention will be clear from a reading of the ensuing part of the specification in conjunction with the accompanying drawings, in which:

FIG. 4 is a diagram showing the relation between a pressure generated and time.

Referring now to FIG. 1, shown at 1 is a gas generator, and a first piston 3 is fitted in a cylinder 2 of the generator 1 in a slidable and fluid-tight relation. Shown at 4 is a seal ring fitted on the outer circumference of the piston 3. Defined in the cylinder 2 of the gas generator 1 are a gas chamber 5 and a liquid chamber 6 by means of the piston 3.

Figure 1:
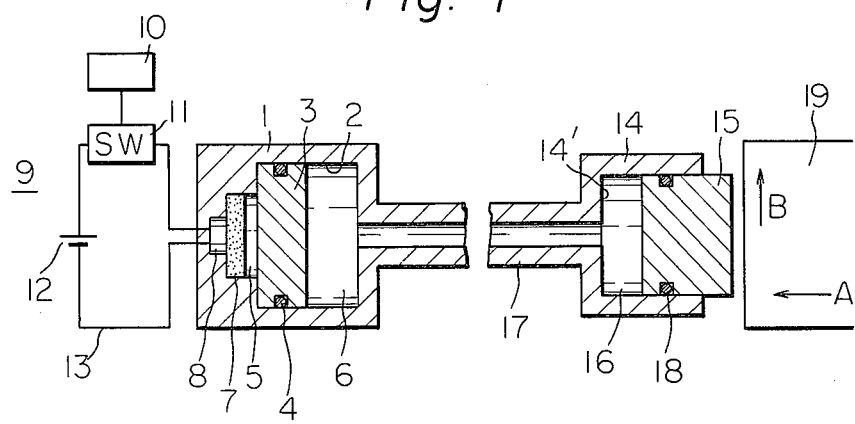
FIG. 1 is a systematic diagram showing the principle of the invention by way of one embodiment of a hydraulic actuating device thereof.

Represented by 7 is a self-combustible material charged in the cylinder 2 and facing said gas chamber 5 therein, and the types and quantity of the aforesaid material are determined by the pressure required to be generated and the rate of pressure rise thereof. It is unnecessary to mention that the self-combustible material within gas generating means 1, including the igniting means 8, should be charged or contained therein in a manner such that they will not be subjected to deterioration or explosion, even if they are placed therein for a long period of time in contact with air within the combustion chamber 5 or, in some cases, with a liquid.

Shown at 8 is an igniting means such as a heater or the like, said igniting means being provided adjacent to the self-combustible material, while there is shown an ignition signal transmitting means 9 adapted to transmit an ignition signal to the igniting means 8.

In this embodiment, however, the ignition signal transmitting means 9 consists of a detecting and signal issuing means 10 for detecting and issuing a signal when a danger or an emergency condition is detected, a switching means 11 adapted to be actuated by said means 10, an igniting means 12 operable by virtue of the feed of electricity by actuation of said switch means 11, a battery 12 and lead wires 13 connecting between the aforesaid components.

Included in the detecting and signal issuing means 10 which are employable in the present invention are such means as a mechanical roller type hydraulic detecting nozzle, a photoelectric switch and the like.

Shown at 14 is an actuating cylinder in communication with the gas generating means 1, and a second piston 15 is fitted in a fluid-tight and slidable relation therein. There is defined a second liquid chamber between the bottom 14' of the cylinder and the piston 15.

The liquid chamber 6 of the gas generating means 1 is in communication through a pipe 17 with the second liquid chamber 16 of the actuating cylinder 14, with a liquid being filled therein.

In this respect, the gas chamber 5 of the gas generating means 1 is normally filled with air. Designated at 18 is a seal ring.

Shown at 19 is an object which is moving in a coaxial direction (arrow A) toward the aforesaid piston 15 or in a direction (arrow B) perpendicular to the axis of the piston 15 and braked by the piston 15.

Figure 2:
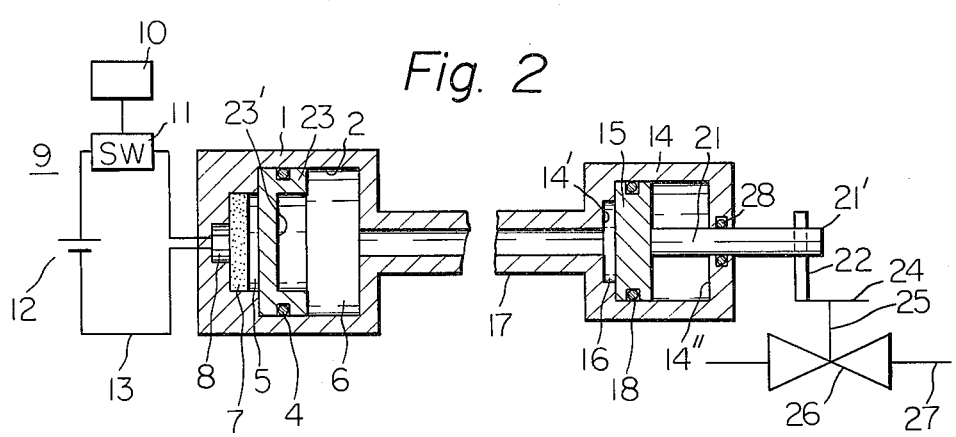
FIG. 2 is a cross-sectional view of an embodiment of the invention, in which the fluid operating device is applied to an emergency-stopping valve for a fluid transfer line.

Turning now to FIG. 2, in which the similar parts will be given the same reference numerals as those in FIG. 1, there is shown at 23 is a modification of the piston 3 contained in the cylinder 2 of the embodiment shown in FIG. 1, and the piston 23 has a hollow portion therein, with the bottom portion 23' thereof being reduced in thickness, whereby the bottom portion is susceptible to breakage under a given pressure. The function thereof will be referred to hereinafter.

The embodiment shown in FIG. 2 represents an emergency stopping valve 26, to which is applied the principle of the present invention, said valve being provided in a pipe line 27 adapted to transfer flammable liquid such as petroleum or chemicals therethrough.

Affixed to the piston 15 in the actuating cylinder 14, in this embodiment, is a piston rod 21 which is provided on the cylinder 14 and extends through a closed end wall 14", with one end thereof projecting from the cylinder 14. The free end 21' of the piston rod 21 is movably connected by way of a connecting rod 22 to an operating handle 24 mounted on an operating rod 25 of an emergency stopping valve 26. When the piston rod 21 is projected from the operating cylinder 14, the operating handle 24 will be rotated, thereby rotating the operating handle 25 so as to close the pipeline 27.

Figure 3:
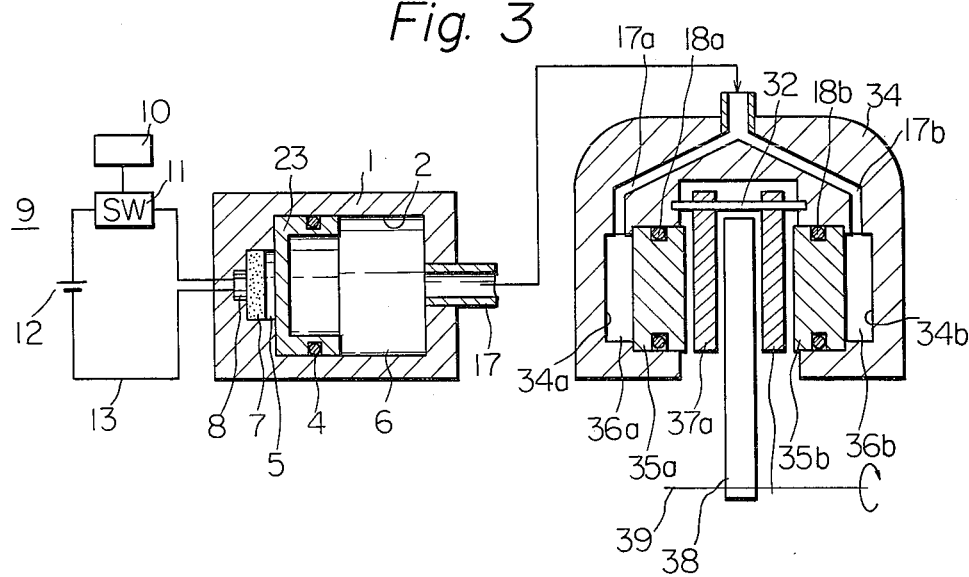
FIG. 3 is a cross-sectional view showing another embodiment of the invention, in which there is shown an emergency brake device applied to a brake device for use in high speed vehicles such as an automobile.

In the embodiment of FIG. 3, the hydraulic actuating device of the present invention is used as an emergency brake, particularly as a disc brake for use in high speed vehicles such as an automobile.

In FIG. 3, the parts similar to those shown in FIGS. 1 and 2 are given the same reference numerals.

Referring now to FIG. 3, shown at 38 is a disc integral with a wheel (not shown) of a high speed vehicle such as an automobile and rotatable about the axial line 39 of an axle and in a plane perpendicular to the drawing. Shown at 34 is a brake cylinder which straddles the circumference of the disc 38. This brake cylinder 34 is a modification of the actuating cylinder 14. The brake cylinder 34 is mounted in a non-rotatable part of a vehicle body in non-rotating relation thereto.

Cylinders 34a and 34b are provided in the limb portions of the brake cylinder 34, said portions straddling the disc 38 and opposing each other, said cylinders extending in parallel to the axial line 39 and being open to the adjacent surfaces of the disc 38. Fitted in the cylinders 34a and 34b are pistons 35a and 35b which are provided in a fluid tight and slidable relation therein. There are defined liquid chambers 36a and 36b between the pistons 35a and 35b and the bottom portions of the cylinders 34a and 34b. Shown at 18a and 18b are seal rings fitted in the cylindrical outer circumferences of pistons 35a and 35b.

Designated at 37a and 37b are friction members provided between piston 35a and disc 38 and between piston 35b and disc 38, respectively, said friction members being rigidly secured to the pistons 35a and 35b, respectively, or held between the pistons and the disc as separate members from the pistons by using a suitable means and in a manner such that the members 37a and 37b are movable in the axial direction of the pistons but are not rotatable in the rotational direction of the disc. In this embodiment, the friction members 37a and 37b are suspended between the pistons and the disc in a movable relation in an axial direction of pistons by being guided by a guide pin 32 affixed to the brake cylinder 34 rigidly.

It should be noted that the friction members 37a and 37b will be referred to as brake shoes in the case of a drum brake.

One end of the pipe 17 communicating, at the other end, with the liquid chamber 6 is connected to the brake cylinder 34, while the upstream portion of the pipe 17 is divided into passages 17a and 17b, which communicate with liquid chambers 36a and 36b permanently.

In the operation of the embodiment shown in FIG. 1, when a detecting and signal issuing means 10, such as a photoelectric detector or a contacting roller, detects an emergency condition, for which the fluid operating device of the invention should operate, a signal indicating such a condition will be fed as an input to the switching means 11. This causes the switching means 11 to turn the ignition signal transmission circuit to the 'ON' condition to feed an electric current to the igniting means 8. When the igniting means 8 is energized, the self-combustible material 7 will be immediately ignited and burns rapidly, thus producing a great quantity of gas which in turn fills the combustion chamber 5. The igniting means 8 may be actuated manually. The pressure in the chamber 5 which is filled with a great quantity of gas will be raised instantaneously, and thus the gas pressure will act on one side of the piston 3, thereby urging same to the right as shown, followed by sliding through the cylinder 2.

The piston 3 thus pressed or urged will then press the liquid, which is a non-compressible fluid, the liquid pressure thus produced and some amount of liquid will be transmitted through pipe 17 into the liquid chamber 16 in the actuating cylinder 14, thereby imparting a thrust to the second piston 15 toward the object 19. Thus, the piston 15 will abut and urge the object 19 moving relative thereto or arresting same against the movement of the latter, thus restricting the movement of the object 19.

The movements of the pistons 3 and 15 are effected for an extremely short time, yet produce a high thrust.

The generating device as used in the present invention should produce a pressure for an extremely short time after the occurrence of an emergency condition and at the same time maintain the pressure for a relatively long period of time, until the emergency condition is released.

Hitherto, a gas generating device has been used to operate a piston under the gas pressure for an intended work or to inflate a bag for survival or lifesaving purpose. However, it can produce a high gas pressure instantaneously but fails to maintain such a pressure for a long period of time.

According to the present invention, the gas generating device uses self-combustible material which is a combination of material of rapidly combustible nature with that of slowly combustible nature, whereby it will produce a high gas pressure instantaneously, yet maintain the same for a long period of time.

Suitable as a rapidly combustible material is a combination of black powder or oxygen-producing material such as potassium perchlorate with a combustible agent (such as aluminum or the like). On the other hand, it is recommendable to use as the slowly combustible material a combination of a combustible agent (such as aluminum or silicon) with oxygen producing material (such as bichromate).

The combustion rate may be controlled by varying the mixing ratio of such ingredients. An example given by the inventors is as follows:

The self-combustible material was prepared by mixing rapidly combustible material which was black powder and a slowly combustible material of a combination of potassium bichromate, silicon, aluminum and dinitronaphthalene. The self-combustible material thus prepared was placed in the gas generating device having a maximum effective volume of 70 cc and ignited. Then, the pressure in the gas chamber 5 was raised to 180 kg/cm$^2$ within 0.08 second after ignition, and the pressure P2 in the liquid chambers 6 was raised to 160 kg/cm$^2$ and stabilized. Furthermore, the pressure P3 in the liquid chamber 16 of the actuating cylinder 14 was raised to 160 kg/cm$^2$ and so maintained for a long period of time without appreciable pressure variation. (FIG. 4)

Such pressure characteristics are most preferable for a hydraulic actuating device for emergency use, where it is required to produce a stable high pressure with an extremely short time lag and maintain the same for a considerably long period of time.

Naturally, the pressure to be obtained, the time required for the pressure to reach a desired pressure, the thrust obtained thereby, etc., may be determined by selecting the types and quantities of the rapidly and slowly combustible materials, dimensions of the gas generating device 1, actuating cylinder and piston, including the stroke thereof.

One of the advantages of the hydraulic actuating device of the invention is that it can produce a high pressure with an extremely short time lag, and it can produce a high thrust.

Unlike a pressure accumulating type device using accumulators or the like, in which a compression gas is filled under a high pressure within a container beforehand and then is discharged therefrom at the occurence of an emergency, the hydraulic actuating device of the invention presents a further advantage in that monitoring for gas leakage from accumulators is not required and that the device may be stored for a long period of time without using same, until an emergency condition is encountered.

In addition, the hydraulic actuating device of the invention avoids the use of a valve mechanism, by which the fluid at a high pressure should be enclosed and, in case of emergency, released, unlike the accumulator type device. Thus, the hydraulic actuating device of the invention is free from troubles such as malfunctioning resulting from corrosion and seizure inherent in such an accumulator type device.

Furthermore, since the actuating cylinder is separated from the gas generating device and in communication through pipes with the gas generating device, it may be set in a desired position, even in a remote position therefrom.

Still furthermore, since the liquid is filled between the liquid chamber of the gas generating device and the liquid chamber of the actuating cylinder and, in addition, the operation of the first piston causes the second piston to operate immediately, the hydraulic actuating device of the invention has a rapid response. Furthermore, the device of the invention renders smaller the stroke of the first piston, such that the volume of the gas chamber may be reduced, whereby the amount of the self-combustible material may be saved or the rate of the pressure rise can be increased in terms of a constant amount of self-combustible material.

The predominant advantages and features of the present invention are as follows: In the embodiment as shown in FIG. 1, the hydraulic actuating device of the invention may be operated, even if the piston used in the gas generating device 1 is omitted. However, in the event that the failure or defects occur in the pipe 17, a high pressure gas produced in the gas generating device will rapidly be ejected through a broken part or a defective part together with liquid, thus presenting a danger of causing a casualty. However, to cope with this, there is provided a piston 3 according to the present invention, such that if liquid is leaked from the pipe 17, the piston 3 will advance to the end of the liquid chamber in gas generating chamber 1 and stop thereat. It follows that the amount of the liquid leaking from the pipe rapidly will be as small as the an amount corresponding to the advancing stroke of the piston 3. In addition, since the high pressure gas is maintained sealingly within the gas generating device 1, this will not give rise to a big accident.

Yet furthermore, from the manufacturing viewpoint, precautions taken may be limited to the gas generating device as far as the precaution against high pressure gas is concerned, and hence pipings and other components may be excluded from such considerations.

Meanwhile, if the piston 3 is not provided, the residual material of the self-combustible material burnt will remain not only in the gas generating device 1 but also in the liquid chamber of the operating cylinder 21 and pipe 17. As a result, this necessarily leads to the disassembly of the entire device for cleaning and for maintenance. However, the provision of the piston 3 in the gas generating device in addition to the operating piston 15 may eliminate such troubles. In other words, cleaning or repair may be confined to the gas generating device 1.

In the operation of the embodiment as shown in FIG. 2, the procedure, in which the self combustible material is ignited upon occurrence of an emergency condition and is burnt rapidly, is the same as in the embodiment shown in FIG. 1.

The great quantity of gas produced due to burning of the self-combustible material rapidly fills the gas chamber 5 in the gas generating device 1 on exert a high pressure to the first piston 3, thereby displacing same in the cylinder 2 to the right in the drawing. It follows that the piston 15 receives the pressure by way of liquid and thus moves to the right through the actuating cylinder 14, then urges the piston rod 21 out of the cylinder 14, and then operates the operating handle 24 by way of connecting rod 22, thereby actuating emergency valve 26 to close the pipeline 27.

In this manner, upon the occurrence of emergency conditions such as fire, pipe failure, a transfer line for transferring flammable fluid or chemicals may be rapidly closed.

A characteristic of the embodiment as shown in FIG. 2 is that the piston 3 placed in the gas generating device 1 has a hollow portion therein which is shown as a piston 23, and that the bottom portion 23' is thinner than the wall portion thereof.

This provides for the possibility that the gas generating device 1 will be deformed due to external factors such as when hit by a stone or such as collision with an obstacle, thereby resulting in a deformed circumference of the cylinder 2 or seizure of the piston 23 due to corrosion caused for some reason or another. More particularly, if there occurs the seizure of the piston and then the self-combustible material is ignited, the pressure within the combustion chamber 5 in the gas generating device 1 will be abnormally increased, thus leading to explosion of the gas generating device.

However, if the strength and dimensions of the bottom portion 23' of the piston 23 are so designed that the bottom portion will be broken when subjected a pressure over a given value, for instance, if the thickness of the bottom portion is relatively small, then the bottom portion will be blown out upon the abnormal pressure rise, with the result that the high pressure gas will flow into the liquid chamber 6 and be mixed with liquid. However, a pressure of the desired level will be applied to the piston 15 in the actuating cylinder 14, thereby ensuring the operation of the device in an emergency.

The advantages and features of this embodiment other than those described are the same as those of the embodiment shown in FIG. 1.

The feature of the embodiment of FIG. 3 lies in the good applicability to the brake device of a high speed vehicle. The brake cylinder 34 corresponding to the operating cylinder in the previous embodiments is constructed in the same manner as in the brake cylinder in a conventional disc brake, and the output end of the gas generating device is connected to the cylinder 34 permanently, without using means such as a check valve.

As in the previous two embodiments, upon occurrence of an emergency condition, a signal is fed to the gas generating device 1 to ignite the self-combustible material 7 for burning same.

A great quantity of gas produced by the combustion of the self-combustible material 7 rapidly fill the gas chamber 5 to exert a high pressure on the first piston 23, whereby the piston 23 will be displaced to the right as viewed in the drawing.

As a result, the liquid in the liquid chamber 6 under a high pressure will flow through the pipe 17, and pipes 17a and 17b of the brake cylinder 34 into the liquid chambers 36a and 36b in the cylinder 34, while exerting a high pressure on pistons 35a and 35b, whereby the pistons 35a and 35b will be moved toward the disc 38 from both sides.

The pistons 35a and 35b thus moving will urge the friction members 37a and 37b to press against the disc 38 on both sides for frictionally engaging therewith.

Then, the friction members 37a and 37b will receive a rotational torque from the disc 38 and transmit same to a vehicle body through the brake cylinder 34 mounted on the non-rotating portion of the vehicle body, thereby controlling the disc 38 provided integrally with a wheel.

In this manner, a high speed vehicle, such as an automobile may be braked and thus stopped.

According to this embodiment, a high braking pressure may be achieved for an extremely short time after detection of an emergency condition, thus preventing an accident such as collision of an automobile, effectively.

Meanwhile, the gas generating device serves a function as a hydraupneumatic accumulator, such that it may follow the variation in stroke due to wear of friction members, thereby achieving a substantially constant operating pressure.

The advantages of the hydraulic actuating device in the embodiment other than those described thus far are the same as those of the previous two embodiments.

Meanwhile, although in this embodiment in FIG. 3 the brake cylinder is shown as having cylinders and pistons on both sides of the disc, it is unnecessary to mention that a piston and a cylinder may be provided on one side thereof and a friction member may be provided on the other side, said friction member being adapted to frictionally engage with one side of the disc under the reaction resulting from the operation of the piston provided on one side, thereby presenting an axially slidable brake cylinder.

In this case, there may be used a detecting and signal issuing means and a switching means of a push-button type, such that when a driver senses a danger, those may be operated manually, or otherwise, those may be a push-button of a foot type.

In either case, this permits instantaneous braking for a vehicle, thereby preventing an accident such as collision.

Naturally, consideration should be given to the driver or passengers to protect them from accidents resulting from such an emergency braking. Those may be remedied by setting a suitable braking speed and using means such as a safety belt or the like.

As is apparent from the foregoing, the hydraulic actuating device is best suited for use as a safety device, and thus it may prove to be advantageous for applications of this kind in industry.

What is claimed is:

1. A hydraulic actuating device, comprising:
   a gas generating means having a first piston reciprocally slidable in a fluid tight relation therein, said means having a first chamber adjacent to the piston on one side thereof, a predetermined amount of self-combustible material in said chamber, and an igniting means therefor in igniting relationship with said material;
   detecting means for detecting an emergency condition, and an electric circuit to which said detecting means is connected and connected to said igniting means for issuing an igniting signal to said igniting means upon detection of an emergency condition by said detecting means;
   said gas generating means having a second chamber on the other side of said piston;
   an actuating cylinder communicating with said second chamber and having a second piston slidable therein, with a liquid filling the space between one side of said second piston and said other side of said first piston in said gas generating means; whereby, when said igniting means is actuated by said signal transmitting means to ignite said self-combustible material, gas pressure produced thereby is applied to said first piston on said one side thereof, thus exerting pressure on the liquid on said other side of the first piston which is transmitted to the actuating cylinder to actuate said second piston.

2. A hydraulic actuating device as set forth in claim 1, wherein said self-combustible material is comprised of a rapidly self-combustible material and a slowly self-combustible material the former burning prior to the latter, thereby producing a high pressure within a short time and the burning of the latter maintains the high pressure for a relatively long period of time after the self-combustible materials are ignited.

3. A hydraulic actuating device as set forth in claim 1, wherein said actuating cylinder is a brake cylinder and said second piston is a brake piston adapted to act through a friction member on an object which is moving relative thereto.

* * * * *